US010474252B2

(12) United States Patent
Kaempf

(10) Patent No.: US 10,474,252 B2
(45) Date of Patent: Nov. 12, 2019

(54) ELECTRONIC PEN

(71) Applicant: Stabilo International GmbH, Heroldsberg (DE)

(72) Inventor: Karl-Peter Kaempf, Roettenbach (DE)

(73) Assignee: Stabilo International GmbH, Heroldsberg (DE)

( * ) Notice: Subject to any disclaimer, the term of this patent is extended or adjusted under 35 U.S.C. 154(b) by 217 days.

(21) Appl. No.: 14/905,814

(22) PCT Filed: Jul. 17, 2014

(86) PCT No.: PCT/EP2014/065415
§ 371 (c)(1),
(2) Date: Jan. 17, 2016

(87) PCT Pub. No.: WO2015/007856
PCT Pub. Date: Jan. 22, 2015

(65) Prior Publication Data
US 2016/0154485 A1 Jun. 2, 2016

(30) Foreign Application Priority Data
Jul. 17, 2013 (DE) .......... 10 2013 214 020

(51) Int. Cl.
*G06F 3/0346* (2013.01)
*G06F 3/0354* (2013.01)
*G06F 3/038* (2013.01)
(52) U.S. Cl.
CPC ........ *G06F 3/03545* (2013.01); *G06F 3/0346* (2013.01); *G06F 3/0383* (2013.01)

(58) Field of Classification Search
CPC .. G06F 3/0354; G06F 3/03545; G06F 3/0346; G06F 3/038; G06F 3/0383
See application file for complete search history.

(56) References Cited

U.S. PATENT DOCUMENTS

| | | | |
|---|---|---|---|
| 4,749,157 A * | 6/1988 | Neufeld | G01P 21/00 244/164 |
| 5,247,137 A | 9/1993 | Epperson | |
| 5,434,371 A | 7/1995 | Brooks | |
| 5,819,206 A | 10/1998 | Horton | |
| 5,902,968 A | 5/1999 | Sato et al. | |
| 6,212,296 B1 * | 4/2001 | Stork | G06F 3/03545 178/19.01 |

(Continued)

FOREIGN PATENT DOCUMENTS

| | | |
|---|---|---|
| CN | 100432904 C | 11/2008 |
| DE | 202012102752 U1 | 9/2012 |

(Continued)

*Primary Examiner* — Antonio Xavier
(74) *Attorney, Agent, or Firm* — Bradley Arant Boult Cummings; Timothy L. Capria

(57) ABSTRACT

Included herein is an electronic pen (100) with pen position detection, comprising at least a writing lead (113), at least an electric voltage source (103), at least one digital control unit (120) and at least one data transfer module (111), characterized in that the electronic pen (100) comprises at least three position determination sensors (105, 112, 104), wherein said determination sensors are configured such that from their measurement data an over-determination of the position and/or movement of the electronic pen (100) can be determined.

20 Claims, 2 Drawing Sheets

(56) References Cited

U.S. PATENT DOCUMENTS

| | | | |
|---|---|---|---|
| 6,456,749 B1 | 9/2002 | Kasabach et al. | |
| 2002/0190947 A1* | 12/2002 | Feinstein | G06F 1/1626 345/158 |
| 2003/0216884 A1* | 11/2003 | Cardarelli | G01C 19/5719 702/145 |
| 2004/0140962 A1* | 7/2004 | Wang | G06F 3/0346 345/179 |
| 2004/0222976 A1* | 11/2004 | Muresan | G06F 3/0346 345/179 |
| 2005/0212760 A1* | 9/2005 | Marvit | G06F 1/1613 345/156 |
| 2006/0100820 A1* | 5/2006 | Davidson | G01B 21/22 702/151 |
| 2006/0290236 A1 | 12/2006 | Ikehashi | |
| 2007/0140776 A1 | 6/2007 | Lapstun et al. | |
| 2008/0042973 A1* | 2/2008 | Zhao | G01C 17/30 345/156 |
| 2009/0174728 A1* | 7/2009 | Ferrer | A63F 13/10 345/619 |
| 2009/0244015 A1* | 10/2009 | Sengupta | H04W 4/21 345/173 |
| 2010/0135801 A1* | 6/2010 | Melius | F03D 7/0224 416/44 |
| 2011/0105957 A1 | 5/2011 | Kourogi | |
| 2011/0263950 A1* | 10/2011 | Larson | A61B 5/1113 600/301 |
| 2012/0130667 A1 | 5/2012 | Fukushima | |
| 2012/0150441 A1* | 6/2012 | Ma | G01S 5/0252 701/510 |
| 2012/0194485 A1 | 8/2012 | Lee | |
| 2012/0260220 A1* | 10/2012 | Griffin | G06F 3/033 715/863 |
| 2012/0328216 A1 | 12/2012 | Silverbrook et al. | |
| 2013/0080811 A1 | 3/2013 | Low et al. | |
| 2013/0088465 A1* | 4/2013 | Geller | G06F 3/03545 345/179 |
| 2013/0106770 A1 | 5/2013 | Bakken et al. | |
| 2013/0106797 A1* | 5/2013 | Pant | G06F 3/0383 345/179 |
| 2013/0106800 A1* | 5/2013 | Yilmaz | G06F 3/044 345/179 |
| 2013/0215019 A1* | 8/2013 | Liberty | G06F 3/017 345/157 |
| 2013/0229392 A1* | 9/2013 | Weiss | G06F 3/03545 345/179 |
| 2013/0316675 A1* | 11/2013 | Luna | H04W 4/24 455/408 |
| 2014/0168142 A1* | 6/2014 | Sasselli | G06F 3/0416 345/174 |
| 2014/0203079 A1* | 7/2014 | Zumsteg | G06K 7/10009 235/385 |
| 2014/0267182 A1* | 9/2014 | Fergusson | G06F 3/03545 345/179 |
| 2014/0282059 A1* | 9/2014 | Oh | G06F 1/1641 715/744 |

FOREIGN PATENT DOCUMENTS

| | | |
|---|---|---|
| EP | 1441279 A2 | 7/2004 |
| JP | 0954653 | 2/1997 |
| JP | 10040008 | 2/1998 |
| JP | 10198509 A | 7/1998 |
| JP | 11296290 | 10/1999 |
| JP | 11338626 A | 10/1999 |
| JP | 2004227563 A | 8/2004 |
| JP | 2004284341 A | 10/2004 |
| JP | 2005099955 | 4/2005 |
| JP | 2006226802 A | 8/2006 |
| JP | 2007005635 A | 1/2007 |
| JP | 2007206907 A | 8/2007 |
| JP | 2012112789 A | 6/2012 |
| JP | 2013029512 A | 2/2013 |
| KR | 102004069176 A | 8/2004 |
| KR | 1020060000179 A | 6/2006 |
| KR | 102007042858 | 4/2007 |
| KR | 1020090066328 | 1/2011 |
| WO | 0207424 A2 | 1/2002 |
| WO | 002007046604 | 4/2007 |
| WO | 2010001970 A1 | 1/2010 |

* cited by examiner

ELECTRONIC PEN

This is a non-provisional patent application claiming priority to co-pending PCT Application Serial No. PCT/EP2014/065415 filed Jul. 17, 2014 and entitled "Electronic Pen".

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

BACKGROUND

This disclosure relates to an electronic pen with a pen position detection system, an apparatus for the electronic detection of pen positions, and a method for the electronic detection of pen positions.

The ever increasing use of electronic information and communication systems, especially of personal computers (PCs), laptops, tablets and smart phones in everyday life, leisure and work, makes it worthwhile to develop improvements of human-machine interfaces.

Besides human-machine interfaces such as keyboard, mouse or touch-sensitive surfaces, electronic pens are especially of interest. Electronic pens have inter alia the advantage that they can combine the functionality and simplicity of writing with a pen on a surface with the much more numerous possibilities of electronic data processing. Thereby it is desirable that the electronic pen is similar to a conventional pin as far as possible in appearance and handling.

In WO02/07424A2, for example, an electronic information system for handwriting recognition is described, which has a pen and a tablet with pressure- or induction-sensitive surface and in which the movements of the pen or the pen tip are captured either from the pressure or induction-sensitive surface of the tablet or by acceleration sensors or optical sensors.

The sensor data can then be transmitted wirelessly to a PC, which can, based on the received pen motion data, perform handwriting recognition.

A disadvantage of known electronic information systems for handwriting recognition however is, among other things, that the pen position data can not always be detected with sufficient accuracy and this can for example lead to an erroneous determination of the pen movement.

It is therefore the objective of the current disclosure to improve an electronic pen, especially with regard to the accuracy of the pen position detection.

BRIEF SUMMARY

According to the disclosure, said objective is achieved by an electronic pen with a pen position detection system, an apparatus for the electronic detection of pen positions, and a method for the electronic detection of pen positions.

Advantageous embodiments and further developments are the subject of the disclosure herein.

Therein, an electronic pen with pen position detection can comprise at least a writing lead, at least an electric voltage source, at least one digital control unit and at least one data transfer module. In addition the electronic pen can have at least three position determination sensors, wherein said position determination sensors may be configured such that from their measurement data an over-determination of the position and/or movement of the electronic pen can be determined.

An electronic pen can be considered as a rigid body, i.e. it has three translational degrees of freedom and three rotational degrees of freedom, amounting to a total of six degrees of freedom of motion. As a rule, two three-dimensional position determination sensors are sufficient to describe the position and/or movement of the electronic pen in a three-dimensional coordinate system, apart from any necessary initializations of the selected coordinate system and integration errors.

In the following, unless explicitly mentioned otherwise, position determination sensors are to understand as position determination sensors that can measure accelerations and/or the strength of the local magnetic field and/or rotation rates in three mutually orthogonal spatial directions.

An electronic pen according to the disclosure may, due to its at least three position determination sensors, allow an over-determination of the pen position data or the pen position and/or the movement of the electronic pen in a three dimensional coordinate system.

This on one hand has the advantage that by, for example, averaging independently measured pen position data the pen position can be more accurately determined, and on the other hand that ambiguities with respect to the position and/or movement of the electronic pen in a three dimensional coordinate system can be avoided.

Said ambiguities in the pen position data measured by position determination sensors are due to the fact that, in the case of parallel alignment of two axes of rotation, for example the axes of a gimbal mounted position determination sensor for measuring three-dimensional rotation rates, the information about one degree of freedom is lost and the movement of the electronic pen can no longer be uniquely described. This example of the loss of degree of freedom information is also referred to as so-called gimbal blockade.

This problem however does not occur in an electronic pen according to the invention, since the at least three position determination sensors can capture all six degrees of freedom at least once and in a unique way for each position and/or movement of the electronic pen.

Another source of inaccuracies in the position data stems from thermal noise in the circuits of the position determination sensors. This stochastic noise signal can be significantly reduced by averaging over a sufficient number of sensors.

Further inaccuracies may be caused by the time delay or offset in the acquisition of data, since they are read out serially via a data bus and treated thereafter as if they were recorded at exactly the same time. Again, the averaged signals of multiple sensors can be a good way to minimize this error.

Besides said position determination sensors, the electronic pen can comprise a force sensor, which is coupled to the writing lead.

This has the advantage that, for example, only when a measurement exceeds a predetermined force, for example triggered by the pressing or pressure force applied to the writing lead when mounting the electronic pen on a writing substrate, such as paper, the position determination sensors and/or the digital control unit and/or the data transfer module need to be fully enabled.

This can reduce the energy or power consumption of the electronic pen, since one can distinguish between use and non-use of the electronic pen for writing or drawing on a writing substrate and for example in the case of non-use, the position determination sensors and/or other electrically operated elements of the electronic pen may be partially or completely switched off.

On the other hand, the electronic pen can of course also be used without writing substrate, for example, to write freely or to perform gestures in space, wherein even in the absence of a specific pressure force applied to said force sensor or in the case of measurement of pressure forces, which are consistent with the mass of the writing lead and with the acceleration of the electronic pen, the position determination sensor and/or the digital control unit and/or data transfer module can be partially or fully activated.

This is mainly of importance for processes like line breaks or turning the page, as in this case no contact of the lead with the writing substrate occurs. Therefore, it may, for example, be useful to allow the position determination to continue to run for a few seconds more, after the writing pressure is suspended. Any following movement patterns can then be classified into types, and can trigger corresponding functions in a signal or data receiving device, for example an external data processing unit. For example, for a predominantly motion against the direction of writing without writing pressure, the input point for the next stroke should be positioned at the beginning of the previous line and at a line height below the previous line.

Advantageously, the analysis of the force sensor data provides as a byproduct information about the level of the writing lead, as the force sensor data may also be sensitive to the detection of changes in the mass of the writing lead. Furthermore the pressures induced by mass forces and measured by the force sensor can be compared to the accelerations in the longitudinal direction of the pen measured at the same time, which allows conclusions on the mass of the writing lead and thus their level.

The force sensor can thus serve not only as an on/off switch. In particular, the force sensor can provide an analog or proportional signal, i.e. can measure pressure force strength or changes in pressure force strength, which for example can be of interest for aids to learning to write, as well as for various modes of representation of written characters, which for example can be represented on an external display unit with different colors and/or line thickness.

Position determination sensors can be designed as inertial sensors whose measuring principle is based on the inertia and the mechanical displacement of spring mounted test masses. Preferably, such inertial sensors can be implemented as so-called inertial Micro-Electro-Mechanical Systems (MEMS), wherein for example mechanical structures can be mapped into a layer of polysilicon.

However the use of position determination sensors which are not inertial sensors is also possible, and such position determination sensors may be based on other measurement principles, such as magnetic field sensors that operate on the basis of the Hall-effect or the giant magneto-resistance effect and which can be implemented with no moving mechanical parts. A preferred embodiment may comprise, for example, Förster-probe type sensors, also called flux-gate sensors.

The position determination sensors can initially measure pen positions in the body-fixed comoving coordinate system of the electronic pen. A transfer to an absolute reference system for the coordinates of the electronic pen can be done by transformations as further described below in more detail.

At least two of the plurality of position determination sensors of the electronic pen can be three-dimensional acceleration sensors, and one position determination sensor can be a three-dimensional rotation rate sensor.

Alternatively, at least two of the plurality of position determination sensors can be three-dimensional acceleration sensors, and one position determination sensor can be a one-dimensional or two-dimensional or three-dimensional magnetic field sensor.

A preference for acceleration sensors over rotation rate sensors may inter alia be based on the fact, that acceleration sensors can be more energy-efficient than rotation rate sensors, which can advantageously affect the operating life of the electronic pen.

However, the use of rotation rate sensors may offer the advantage that movements of the electronic pen in space independent of a writing substrate can be measured more easily and that the signal quality, in particular for rotary motion around the longitudinal axis, is higher.

It is therefore possible that at least two of the plurality of position determination sensors can be three-dimensional rotation rate sensors, and one position determination sensor can be a three-dimensional acceleration sensor.

Further, an electronic pen is conceivable in which at least one position determination sensor can be a three-dimensional rotation rate sensor, at least one position determination sensor can be a three-dimensional acceleration sensor, and at least one position determination sensor can be a one-dimensional, or two-dimensional, or three-dimensional magnetic field sensor.

In addition, the electronic pen can include an air pressure sensor through which advantageously using the barometric formula and the known reference air pressure at sea level, the position of the electronic pen in altitude difference can be determined and can be used to initialize the position determination sensors.

The evaluation and analysis of the air pressure sensor data can preferably be done outside of the electronic pen, i.e. externally, in a data processing or data analysis unit, such as a PC, laptop, tablet, or smart phone, which can receive the data from all sensors of the electronic pen as sent by the data transfer module.

Said data processing unit can comprise a database or can have access to databases which store and provide all possible and required up to date time- and/or site-dependent data values for initializing, such as the reference air pressure at sea level and/or the value of the acceleration due to gravity, and/or the value of the earth's magnetic field strength.

For the determination of the position however, a relative determination may be sufficient, wherein pressure changes are interpreted as altitude changes. A possible disadvantage of this may be the susceptibility to influences of the environment, for example air pressure changes as a result of opening or closing a nearby door. However, such changes may be, for example, easily filtered out with a second, stationary air pressure sensor. This stationary pressure sensor may be advantageously placed in a receiving device, for example said data analysis or processing unit.

The electronic pen may also have at least one combination sensor into which at least two sensors of different or of the same type may be integrated, for example a combination sensor can comprise a three-dimensional rotation rate sensor and a three-dimensional acceleration sensor.

It is also possible that the combination sensor, for example, may comprise a three-dimensional acceleration sensor and a one-dimensional, two-dimensional, or three-dimensional magnetic field sensor, or the combination sensor may comprise a three-dimensional rotation sensor and a one-dimensional, two-dimensional, or three-dimensional magnetic field sensor. Another example for a combination sensor would be that it can comprise a three-dimensional rotation rate sensor, a three-dimensional acceleration sensor and a one-dimensional, two-dimensional, or three-dimensional magnetic field sensor. The use of combination sensors advantageously allows a more compact design of the electronic pen and can also possibly reduce the production costs of the electronic pen.

Combination sensors can also have data processing and analysis electronics which can process the data in all spatial directions of all sensor types, and, for example at the digital outputs already provide drift compensated signals, in particular for example drift compensated angle signals in quarternions and or Euler angles.

Thereby combination sensors may occupy surface areas that for example may be less than 5 mm×5 mm.

From the sensor signals of the position determination sensors the motion or movement profile is created by integration (cumulative summation) of the accelerations. From the for a certain time period determined velocities, the traveled distance can be calculated by a further integration.

For better use of the recorded data, it may be helpful to know the initial conditions or initial reference data, i.e. for example, information about the speed and/or the position at the beginning of the integration processes may be required or provided.

Since one can not expect the user of the electronic pen to constantly conduct an adjustment with reference points, an initialization of the initial conditions on the basis of characteristic or distinctive activities in the normal use of the electronic pen is possible. Such initialization activities can be, for example, putting down the pen, the average writing direction or a direction reversal for individual letters. Also the measurement of contact with the writing substrate, for example paper, which can be measured by the previously described force sensor coupled to the writing lead, can be used to determine such initial reference data.

For the use and the data analysis of the electronic pen, especially the knowledge of the position and movement of the pen tip or writing lead tip of the electronic pen is relevant. For technical reasons however, it can be easier and sometimes it can even be more advantageous with respect to position determination accuracy, to integrate the position determination sensors directly into the pen tip. The position and/or movement of the pen tip however, can be calculated by a corresponding coordinate transformation of the data from the position determination data sensors.

Although the data from the sensors of the electronic pen can also be partially or completely processed and/or analyzed by the digital control unit of the electronic pen, it may be preferable depending on the energy required for such processing, that the sensor data can be sent, for example wirelessly, in a largely unprocessed form to an external data processing or analysis unit. However, it is possible for example, that proprietary algorithms can be placed in the digital control unit of the electronic pen and/or that a preprocessing can take place there, wherein the raw data, from sensors are present in a reduced representation, e.g. with separate translational and rotational components. This can also help to reduce the to be transferred data volume, which in turn—depending on the extent of this reduction—can lead to significant energy savings.

Advantageously, at least two acceleration sensors can be arranged as far as possible from the center of the electronic pen (such as the center of the longitudinal axis of the electronic pen), in order to optimize the acceleration signal strength and so that using the difference of their registered accelerations, information about the rotation of the electronic pen can be obtained. The average of the accelerations in the three axes thereby may be regarded as the translational acceleration in the respective axes.

In general, position determination sensors can be arranged along the longitudinal axis of the electronic pen and/or along an axis parallel and/or not parallel to the longitudinal axis of the electronic pen.

In particular, the acceleration sensors may be arranged along the longitudinal axis of the electronic pen or may be arranged preferably along an axis parallel or oblique or perpendicular to the longitudinal axis.

An additional rotation rate sensor, which can also be arranged along the longitudinal axis of the electronic pen, or which preferably can be arranged along an axis parallel, oblique or perpendicular to the longitudinal, can improve the signal quality for rotational accelerations about the longitudinal axis and prevent ambiguities in the position or movement determination of the electronic pen.

Alternatively or additionally to a rotation rate sensor, a third acceleration sensor can for example be arranged with an circumferential offset of 180°+/−90° along a circumference relative to the position of one of the first two acceleration sensors, in order to resolve ambiguities in the position or movement determination, for example, by evaluating the sign of the acceleration sensors.

To further facilitate the signal processing, it may be advantageous to position the second position determination sensor in a plane, which is orthogonal to the longitudinal axis of the pen and which may be in the plane of the first position determination sensor.

Both position determination sensors can be located on a circle whose center point can be defined by the longitudinal axis of the pen. Their position on the circle can be, for example, at 0° and 180°, when the whole circumference measures 360°.

In addition however, any other positioning is possible, provided that the distance between the two position determination sensors perpendicular to the axis, in which a rotation is to be measured by the difference signal, is sufficiently large.

Further, magnetic field sensors and other sensors may also be arranged along the longitudinal axis of the electronic pen or along an axis parallel, oblique or perpendicular to the longitudinal axis.

The positioning of a previously mentioned, optional air pressure sensor is almost arbitrary, since it only provides a relative signal, and can for example be subject only to limitations arising from considerations for the optimization of circuit designs.

The arrangement of position determination sensors, which are designed as combination sensors, also called sensor cluster, can also be made along the longitudinal axis of the electronic pen or along an axis parallel, oblique or perpendicular to the longitudinal axis.

In a combination sensor, for example, consisting of an acceleration sensor and at least one other position detection sensor such as a rotation rate sensor or a magnetic field sensor, it may be an advantage in some circumstances, to arrange said combination sensor as centrally as possible in the electronic pen. If for example, the acceleration sensor of the combination sensor is foreseen to mainly cover only translational movements, a central arrangement of the combination sensor and the acceleration sensor may result in a lower noise and interference component.

The position determination sensors can be located on or in the housing of the electronic pen, or on a component between the writing lead and said housing. Said component may have a cylindrical shape and, for example, may be a circuit carrier sleeve, such as described in FIG. 1a or 1b.

It is also conceivable to construct the circuit on a film for insertion into an injection mold or injection molding tool. Since the soldering temperatures (e.g. 238° C. for vapor phase soldering) are far higher than the processing temperatures of common plastics, in this case no thermal damage would occur during the encasing with plastic, and the components could be optimally fixed. At the same time such an optional embedding of the circuit carrier or the position determination sensors into the pen sleeve or housing would allow to maximize the sensor distances from the longitudinal axis of the pen.

The electronic pen can have a modular build-up, and can have, for example plug-in and or screw connections, so that e.g. the writing lead and/or a battery used as a voltage source can be easily replaced. However, a single-use or disposable model without interchangeable parts is also conceivable.

The writing lead, which for example can write with easy glide writing paste or ink, can for example have a diameter of 2 mm to 10 mm, preferably of 4 mm to 5 mm. The length of the writing lead can lie between 50 mm to 200 mm, preferably between 80 mm to 100 mm.

The housing of the electronic pen can have a substantially cylindrical shape. Further conceivable are cuboidal or polyhedral housing forms, or cylindrical shapes with convex or concave polygonal cross-sections.

When embedding the circuit in the housing, a polygonal design of the inner surface of the housing can be recommended, which can make it possible to position the components on planar portions of the inside surface. This allows for example to avoid damage to the contacting of the components to the circuit carrier or circuit substrate when inserted into the injection molding tool.

The electronic pen can for example have a length of between 90 mm and 200 mm, and can have average diameters or average outer diameters of from 3 mm to 20 mm. From an ergonomic point of view, an outer diameter of 5 mm-12 mm can be preferred, which can place high demands on the packaging of components.

Advantageously, the shape of the electronic pen can be chosen so that it may be similar in appearance and handling of a conventional pen as far as possible.

Depending on the mode of operation of the electronic pen different initializations of the coordinate system used for the evaluation and analysis of the electronic pen positions can be made. While it may be useful to know the absolute position of the electronic pen on the writing substrate when drawing (or the position relative to reference points on the writing substrate, e.g. paper), a character recognition for example may already be possible from the dynamic movements of the electronic pen alone.

For example, to define a coordinate system on a two-dimensional writing substrate, e.g. paper, in general three reference points are required. Assuming that the user contacts the writing substrate always in the same plane as he draws, the integrated force measurement can allow to manage with two reference points only, which determine the horizontal position of the writing substrate. All further writing substrate touches or contacts can then be used to determine the drawing or writing plane.

A force sensor coupled to the writing lead can thereby provide useful data for calibration and initialization of the writing plane, and for example can compare or match acceleration values of position determination sensors with writing pressure force data, so that for example a sinking down of the electronic pen below the writing plane can be recognized as not allowed.

An initialization process may, for example, be conducted by touching the corners of the writing substrate, which at the same time may also serve to define the available drawing area.

However, it can not always be assumed that the position of the writing substrate is constant. Therefore, it is useful to define an absolute reference system, for example an orthogonal reference system with axes x, y, z, wherein for example the z-axis can be opposite to or in the direction of the gravitational acceleration. To determine the rotation of the xy-plane for example, the Earth's magnetic field can be used as a reference system. Hereinafter this absolute reference system shall also be referred to as geo-reference system.

The conversion or transformation of coordinates in the body-fixed moving coordinate system of the electronic pen, i.e. the coordinate system in which the position determination sensors are measuring, over into the geo-reference system and vice versa, may then, after initialization of the position determination sensors, for example simply be performed by translational and/or rotation transformation.

Position determination sensors and other sensors may, for example during the use of the electronic pen, record at least every 50 ms data, so as to ensure that the sampling frequency lies over the eigenfrequency or natural frequency (for example 5 Hz) of the hand of the writing user, in order to detect and capture all movements of the hand or the electronic pen.

The resolution and accuracy of the electronic pen position detection, can for example be less or better than 1 mm.

It is also possible, instead of a permanent absolute pen position detection, to track patterns of movement of the electronic pen over a period of for example 1 s, 2 s, 4 s, or 6 s or longer, to be able to assign the recorded movement patterns to individual letters and/or words This assignment or analysis may for example be done on an external data processing unit.

Measured position determination data can be vectorized by the digital control unit, or otherwise formatted and subsequently transmitted via the data transfer module to a data receiving module and a data processing unit for analyzing and processing the received data. This can for example be done using an encrypted wireless data transfer according Bluetooth Low Energy (BLE)-standard.

A data processing unit integrated into the pen, e.g. for integration and error correction of the measured data is also possible, and may allow a reduction in the volume of data to be transmitted and a higher robustness against data failures. Optional these data produced by the integrated data processing unit of the electronic pen can be transmitted via the data transfer module.

Alternatively or additionally, an external data processing unit can for instance perform an integration and error correction of the data received by a data receiving module.

The data processed by a data, processing unit of the electronic pen and/or data processed by an external data processing unit, can be output to a data output unit and/or stored on a data storage unit.

For error correction, among other techniques, Kalman filter techniques can be used here, for example including position determination sensor data in correlation with the data from the force sensor coupled to the writing lead. Advantageously, therefore for example an artificial drift in the baseline of a writing direction, due to a faulty-integration of sensor data can be corrected.

A possible outsourcing of the actual processing of the position determination data, such as for example handwriting recognition processing, has the advantage, that the digital control unit is relieved of computational intensive and/or memory-intensive processing steps, which could impair the smooth operation of sensor data collection, and which under certain circumstances, can adversely affect the operational life of a battery serving as a voltage source of the electronic pen.

However, as mentioned above, the processing of the data collected and recorded by the sensors of the electronic pen can also occur in the pen itself.

Furthermore, it is also conceivable for example, that the data transfer module of the electronic pen also can receive data from an external device, in particular control and/or configuration commands.

The electronic pen can therefore be in communication with external devices, both to receive and to send.

It should also be noted that the electronic pen can also simply be used conventionally, e.g. for writing and/or drawing with the writing lead, operated with easy glide writing paste or ink.

DETAILED DESCRIPTION

Figures 1A, 1B:
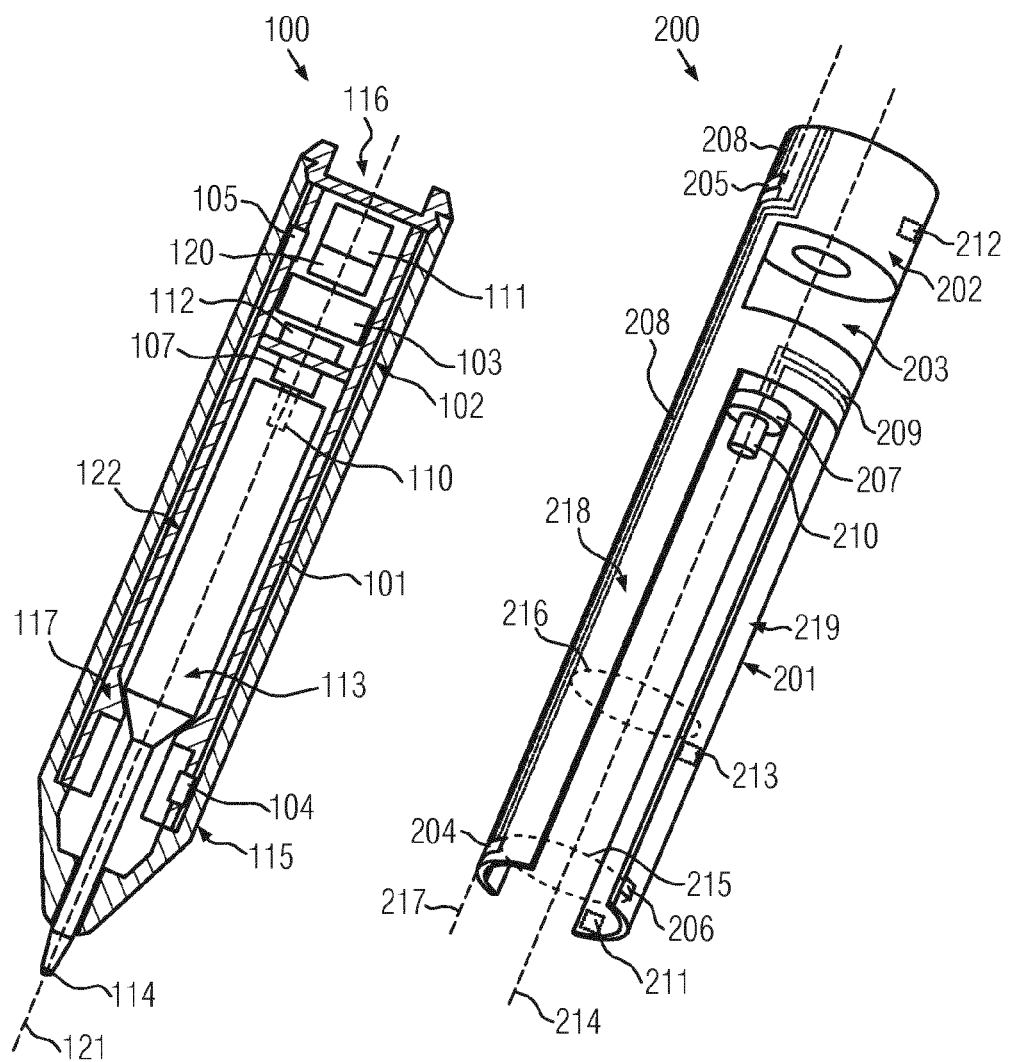
FIG. 1a: Exemplary embodiment of an electronic pen.
FIG. 1b: Exemplary embodiment of a circuit carrier sleeve

FIG. 1a illustrates an example of an electronic pen 100 according to the current disclosure.

Therein a writing lead 113, e.g. filled with easy glide paste or ink, may be held or wrapped by a circuit carrier sleeve 122, wherein said circuit carrier sleeve 122 may be in turn be surrounded by the housing 115 of the electronic pen.

The circuit carrier sleeve 122 may optionally include a protrusion 117 on the second sleeve portion 101 of the circuit carrier sleeve 122, which may serve for holding the writing lead.

A force sensor 107 can be coupled to the writing lead 113, for example via a pin 110, and measure a pressure or acceleration force applied to the writing lead 113.

The circuit carrier sleeve 122 may also host a first position determination sensor, for example a rotation rate sensor 112, which may be arranged along the longitudinal axis 121 of the electronic pen 100, for example in the first sleeve member 102 of the circuit carrier sleeve 122.

A second and third position determination sensor may be located on the circuit carrier sleeve 122 and outside of the longitudinal axis 121. For example, a first acceleration sensor 105 may be attached on the first sleeve portion 102 of the circuit carrier sleeve 122, for example preferably in the vicinity of the end/end cap 116 opposite to the pen tip 1 of the electronic pen.

A second acceleration sensor 104 can, for example, be arranged on the second sleeve portion 101 of the circuit carrier sleeve 122, preferably in almost the maximum distance to the first acceleration sensor 105, thereby advantageously allowing to improve the accuracy in determining the position and motion, in particular the information about a rotation of the electronic pen 100, from the difference between the accelerations measured in two different locations.

A voltage source 103, e.g. a battery for supplying power to the electronic pen 100, may be located within the first sleeve portion 102 of the circuit carrier sleeve 122, as well as a digital control unit 120 and a data transfer module 111.

A data transfer module 111 can send the data of the electronic pen 100 to an external data processing unit (not shown) and a data receiving module (not shown).

The electronic pen 100 may have a closing cap (not shown), which can for example be plugged or screwed onto the end cap 116 when the electronic pen 100 is in use.

The electronic pen 100 may have a modular construction, using for example plug-in and/or screw connections, so that e.g. the writing lead 113 and/or a battery used as voltage source 103 can be easily replaced. However, a single-use or disposable model of the electronic pen 100 without interchangeable parts is also conceivable.

FIG. 1b shows an example of an alternative circuit carrier sleeve 200 of an electronic pen according to the invention.

The circuit carrier sleeve 200 may comprise a first sleeve portion 202 and a second sleeve portion 201, the second sleeve portion 201 may include two flanges 218, 219, which may comprise a writing lead (not shown, but for example analogously to writing lead 113), but which for example do no not have a protrusion analogous to protrusion 117 from FIG. 1a. The first sleeve portion 202 may include a compartment 203 for receiving a voltage source, such as a battery for example.

A plurality of position determination sensors of various types, i.e. acceleration sensors, rotation rate sensors, magnetic field sensors, air pressure sensors and combination sensors, can be positioned at almost any location on the surface of the circuit carrier sleeve 200.

Exemplary arrangements for an embodiment with three accelerometers are shown. This embodiment may advantageously be characterized by an optimized energy consumption, since acceleration sensors generally use less energy than other position determination sensors such as for example rotation rate sensors.

Therein for example, acceleration sensors 205 and 204 can be arranged on the circuit carrier sleeve 200 along an axis 217 parallel to the longitudinal axis 214 of the electronic pen. The acceleration sensors 205 and 204 may lie on the same axis 217.

Preferably the distance between the acceleration sensors 205 and 204 can almost be maximized, thereby advantageously allowing to improve the accuracy in determining the position and motion, in particular the information about a rotation of the electronic pen, from the difference between the accelerations measured in two different locations.

A third acceleration sensor 206 can for example be arranged opposite the acceleration sensor 204 with an offset of for example 180°+/−90° along a circumference 215 of the circuit carrier sleeve 200. Two acceleration sensors 204 and 206 can thereby lie on the same circumference 215 of the circuit carrier sleeve 200 or on two different circumferences 215, 216 along the longitudinal axis 214 of the electronic pen. The third acceleration sensor 206 may also be arranged at a position 212 opposite of the acceleration sensor 205 on the first sleeve portion 202 of the circuit carrier sleeve 200.

It is also conceivable that all the three acceleration sensors are arranged on different axes parallel to the longitudinal axis 214 of the electronic pen, i.e. for example as in the shown arrangement with acceleration sensors 205, 206 and with acceleration sensor 204 at an alternative position 211.

Another exemplary alternative position for a position determination sensor such as an acceleration sensor is denoted by 213.

Advantageously, at least two of the three acceleration sensors 205, 204, 206 may be arranged on the same axis parallel to the longitudinal axis 214 of the electronic, in order to make the processing and analysis algorithm simpler, since in this case only values from respectively one axis of the sensors have to be taken into account to compute differences and averages.

Electrical conductive paths 208, 209 may transport the sensor signals of the force sensor 207 to a digital control unit (not shown).

Analogous to the example of FIG. 1*a*, the force sensor 207 may be coupled by a pin 210 to a writing lead (not shown).

The signals of the position determination sensors, such as the acceleration sensors 205, 204, 206 can be forwarded to said digital control unit (not shown) by means of the electrical conductive paths 210, from where the raw or processed sensor data collected by the position determination sensors and other sensors, can be transmitted, preferably wirelessly, by means of a data transfer module (not shown) to an external data processing unit (not shown).

The features of the electronic pen 100 can of course be combined with the features of the circuit carrier sleeve 200. Also, the features as represented in the general description can be combined with the features of the electronic pen 100 or the features of the circuit carrier sleeve 200.

The position determination sensors and other sensors of the electronic pen may be configured such, that they can capture at least every 50 ms data when the electronic pen is in use. The query frequency, with which the digital control unit queries all sensors, can be at least 20 Hz.

Figure 2:
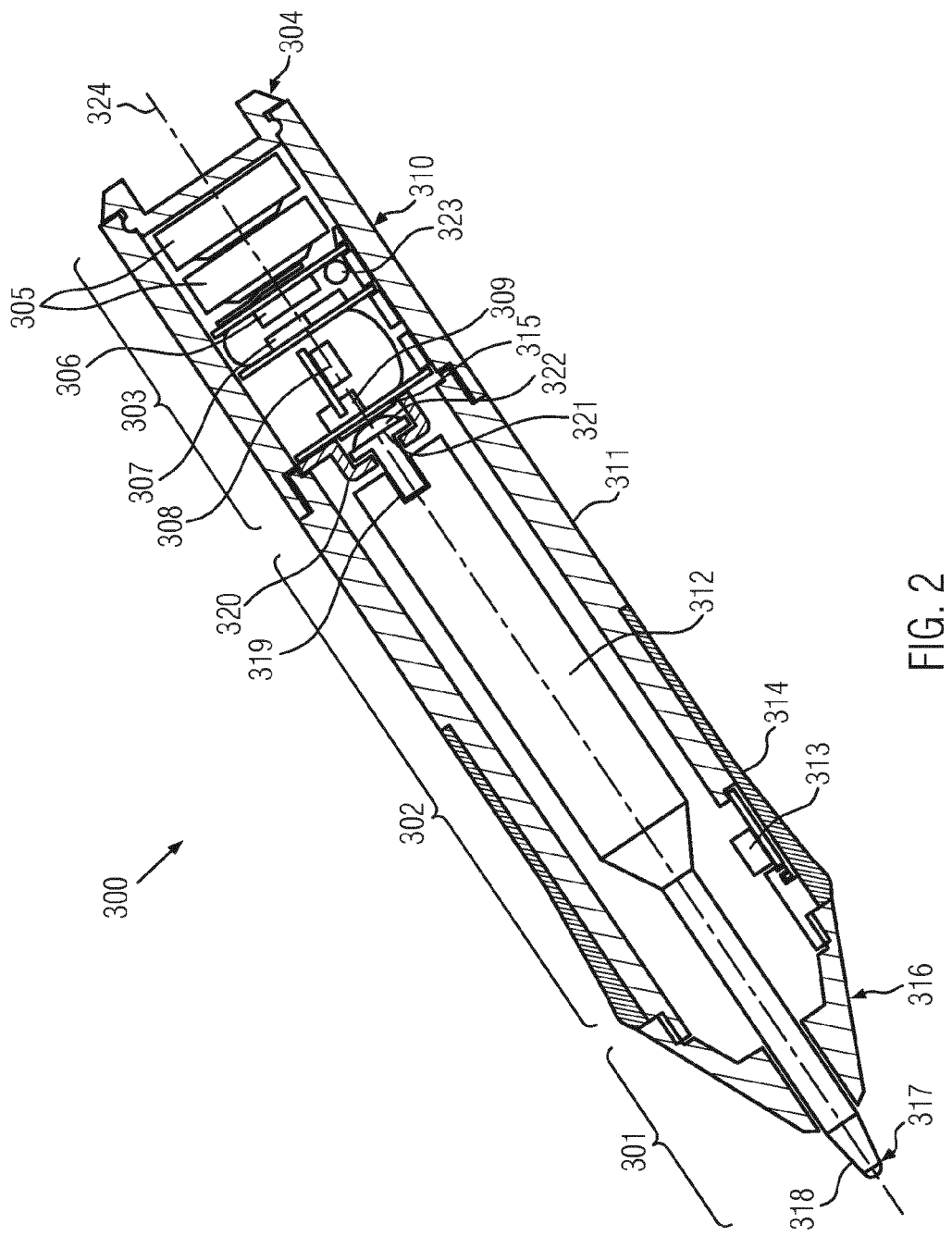
FIG. 2: Further exemplary embodiment of an electronic pen

FIG. 2 also shows an example of a possible electronic pen 300 according to the invention.

It should be pointed out once again that all features described above can be combined in any combination to achieve the benefits described. This means for example, that the electronic pen 300 may also have some or all of the features of the electronic pen.

For reasons of clarity however, only a part or an example of a combination of the features described above is shown in FIG. 2.

The electronic pen 300 may have a housing or sleeve 311. Preferably, the housing 311 may have the geometry of a conventional pen, i.e. it may have a mainly cylindrical shape. Also conceivable are cuboidal or polyhedral housing forms, or cylindrical shapes with convex or concave polygonal cross-sections.

The electronic pen 300 may, for example, have a length of between 90 mm and 200 mm, and average diameters or average outer diameters of from 3 mm to 20 mm, preferably 5 mm to 12 mm.

Said housing 311 of the electronic pen 300 may be divided, for example, in three housing parts, a first part 303, second part 302 and a third part 301, which can be connected with each other screwable or by means of plug-in connections.

The housing portion 303 may comprise, for example, a housing end portion 310, which can be screwed-on to the housing part 302 and which may have an end cap 304 with a battery compartment cover.

Housing part 303 may, among other things, accommodate one or more voltage sources 305, for example zinc-air button cell batteries, such as type 675 (1.4 V, 650 mAh). Housing part 301 may, for example be designed as a screw-on type cone-shaped housing end portion 316 out of which the writing lead 312 can exit. Housing portion. 302 may also include a push-fit type soft grip zone 314.

A data transfer module 306, which can send the data of all electronic components of the electronic pen 300 to an external data processing unit (not shown) wirelessly, may also find place in part 303 or 310 of the housing 311.

Alternatively or additionally, the electronic pen 300 may also be equipped internally with a separate data, processing unit 323 for analysis and/or processing and/or pre-processing of data before they can be send via the data transfer module 306, in order to be output for example on a data output unit (not shown) and/or in order to be saved on a data storage unit (not shown).

A digital control unit, e.g. comprising a microcontroller, is also accommodated in the housing part 303 or 310.

The digital control unit 307 can communicate with all the other electronic components of the electronic pen 300, in particular the sensors, including the position determination sensors, in particular for communicating data and/or control commands and/or to transport electrical energies.

Said connections (not shown) can be realized by means of electrical conductor paths, which can for example be integrated into the housing 311.

A plurality of position determination sensors of various types, i.e. acceleration sensors, rotation rate sensors, magnetic field sensors, air pressure sensors and combination sensors can be placed at almost any location on or in the housing 311 of the electronic pen 300.

Exemplary configurations for an embodiment with two positions for position determination sensors 308, 313 are shown.

Therein, for example, position determination sensor 308 may be for example a combination sensor, for example comprising two acceleration sensors or comprising an acceleration sensor and a rotation rate sensor, and which can be arranged along an axis parallel to the longitudinal axis 324 of the electronic pen in the housing 311, for example, in the housing part 303. Position determination sensor 308 may be designed such that it can be inserted or plugged into a connector strip 309.

Preferably the distance between position determination sensors 308 and 313 can virtually be maximized, for example to advantageously allow to improve the accuracy in determining the position and motion, in particular the information about a rotation of the electronic pen 300, from the difference between the accelerations, rotation rates or other sensor values, measured in two different locations.

A further position determination sensor 313, for example, a further acceleration sensor, or another combination sensor, can for example be arranged along a circumference of the housing 311, for example in the second part 302. In other words, the electronic pen 300 has at least three position determination sensors, wherein for example two sensors (e.g. two acceleration sensors, or an acceleration sensor and a rotation rate sensor) can be combined into combination sensor 308, and the third position determination sensor 313 may, for example, be an acceleration sensor.

Furthermore, the position determination sensor 313 may be located closer to the writing lead tip 318, for example in the second portion 302 of the housing 311.

The arrangement of position determination sensors 313, 308 is, moreover, only exemplary, as they may also be located on or in other parts of the housing 311. It is only important that at least three position determination sensors may be present, which may allow an over-determination of the position and/or movement of the electronic pen.

The electronic pen 300 may include a writing lead 312, which for example may comprise a writing lead tip 318, for example comprising nickel silver, and a writing ball 317, for example comprising tungsten carbide, and for example having a diameter of 0.2 mm to 2 mm, preferably 1.0+/−0.2 mm. The writing lead 312 can be coupled to a force sensor 321, for example by means of a pin 319 for frictionally receiving or connecting with the writing lead 312.

The pin 319 may end in a pin plate 322, which may be coated with a soft conductive material. Said pin plate 322 may, for example, press against a meander-like path of a thin film resistor 315, so that a writing-pressure force-dependent resistance can be established.

A hat cap 320 inserted during the assembly of the electronic pen 300, may serve to accommodate the force sensor 320.

Two sheets with 3 figures are following. The reference numbers are thereby assigned as follows.
100 electronic pen
101 second sleeve portion of the circuit carrier sleeve
102 first sleeve portion of the circuit carrier sleeve
103 voltage source, e.g. battery
104 position determination sensor, acceleration sensor
105 position determination sensor, acceleration sensor
107 force sensor, which can be coupled to a writing lead, for measuring writing pressure
110 pin for coupling the force sensor to a writing lead
111 data transfer module
112 position determination sensor, rotation rate sensor
113 writing lead
114 pen tip/writing lead tip of electronic pen
115 housing of electronic pen
116 end/end cap opposite to the pen tip of the electronic pen, possibly suitable for receiving a closing cap of the pen tip.
117 optional protrusion on the second sleeve portion of the circuit carrier sleeve, which may serve for holding the writing lead.
120 digital control unit
121 longitudinal axis of electronic pen
122 circuit carrier sleeve
200 circuit carrier sleeve of electronic pen
201 second sleeve portion of the circuit carrier sleeve
202 first sleeve portion of the circuit carrier sleeve
203 compartment to accommodate voltage source/battery compartment
204 position determination sensor, acceleration sensor
205 position determination sensor, acceleration sensor
206 position determination sensor, acceleration sensor
207 force sensor, which can be coupled to a writing lead, for measuring writing pressure
208 electrical conductive paths for transporting sensor signals, for example signals from the position determination sensors, to the digital control unit
209 electrical conductive paths for transporting sensor signals, for example signals from the force sensor, to the digital control unit
210 pin for coupling the force sensor to a writing lead
211 possible exemplary alternative location of a position determination sensor
212 possible exemplary alternative location of a position determination sensor
213 possible exemplary alternative location of a position determination sensor
214 longitudinal axis of electronic pen
215 first circumference of circuit carrier sleeve
216 second circumference of circuit carrier sleeve
217 axis on/along circuit carrier sleeve parallel to longitudinal axis of electronic pen
218 first flange of second sleeve portion of the circuit carrier sleeve
219 second flange of second sleeve portion of the circuit carrier sleeve
300 exemplary electronic pen
301 third part of housing/of sleeve/of casing of electronic pen
302 second part of housing/of sleeve/of casing of electronic pen
303 first part of housing/of sleeve/of casing of electronic pen
304 end cap 304 with a battery compartment cover
305 voltage source(s)/battery (batteries), e.g. zinc-air button cell batteries
306 data transfer module, e.g. BLE-module
307 digital control unit, for example comprising a microcontroller
308 position determination sensor(s), e.g. combination sensor
309 connector strip to receive position determination sensor(s)
310 screw-on type first housing end portion of electronic pen
311 housing/sleeve of electronic pen
312 writing lead
313 position determination sensor(s)
314 push-fit type soft grip zone
315 thin film resistor
316 screw-on type second housing end portion, for example cone-shaped, out of which the writing lead can exit
317 writing ball
318 writing lead tip
319 pin for frictionally receiving or connecting with the writing lead
320 hat cap insertable during the assembly of the electronic pen, to accommodate the force sensor for measuring of a writing pressure force or axial pressure force.
321 force sensor
322 pin plate
323 optional data processing unit integrated into electronic pen
324 longitudinal axis of electronic pen

The invention claimed is:

1. An electronic pen comprising:
a pen position detection having a writing lead, an electric voltage source, at least one digital control unit, at least one data transfer module, and a longitudinal axis;
at least three position determination sensors positioned along the longitudinal axis, wherein three of the at least three position determination sensors are three-dimensional acceleration sensors, and wherein said determination sensors are configured and positioned to provide measurement data for the determination of the position and movement of the electronic pen.

2. The electronic pen according to claim 1, further including a force sensor coupled to the writing lead.

3. The electronic pen according to claim 2, further comprising an air pressure sensor.

4. The electronic pen according to claim 1, further comprising an air pressure sensor.

5. The electronic pen according to claim 2, further comprising at least one combination sensor integrating at least two determination sensors.

6. The electronic pen according to claim 1, further comprising at least one combination sensor integrating at least two determination sensors.

7. The electronic pen according to claim 6, wherein the combination sensor comprises a three-dimensional rotation rate sensor and a three-dimensional acceleration sensor.

8. The electronic pen according to claim 6, wherein the combination sensor comprises a three-dimensional acceleration sensor and a sensor selected from the group consisting of a one-dimensional magnetic field sensor, a two-dimensional magnetic field sensor, and a three-dimensional magnetic field sensor.

9. The electronic pen according to claim 6, wherein the combination sensor comprises a three-dimensional rotation rate sensor and a sensor selected from the group consisting of a one-dimensional magnetic field sensor, a two-dimensional magnetic field sensor, and a three-dimensional magnetic field sensor.

10. The electronic pen according to claim 6, wherein the combination sensor comprises a three-dimensional rotation rate sensor, a three-dimensional acceleration sensor, and a sensor selected from the group consisting of a one-dimensional magnetic field sensor, a two-dimensional magnetic field sensor, and a three-dimensional magnetic field sensor.

11. The electronic pen according to claim 6, wherein the combination sensor is arranged along the longitudinal axis of the electronic pen.

12. The electronic pen according to claim 6, wherein the combination sensor is arranged along an axis parallel to the longitudinal axis.

13. The electronic pen according to claim 6, wherein the combination sensor is arranged along an axis oblique to the longitudinal axis.

14. The electronic pen according to claim 6, wherein the combination sensor is arranged along an axis perpendicular to the longitudinal axis.

15. The electronic pen according to claim 1, wherein the combination sensor is arranged along the longitudinal axis of the electronic pen.

16. The electronic pen according to claim 1, wherein the combination sensor is arranged along an axis parallel to the longitudinal axis.

17. The electronic pen according to claim 1, wherein the combination sensor is arranged along an axis oblique to the longitudinal axis.

18. The electronic pen according to claim 1, wherein the combination sensor is arranged along an axis perpendicular to the longitudinal axis.

19. The electronic pen according to claim 1, further comprising a data processor for integration and error correction of the measured and recorded data, wherein the data created by the data processor can be transmitted.

20. An apparatus for the electronic detection of a position of an writing utensil, the apparatus comprising:
an electronic pen having a pen position detection having a writing lead, an electric voltage source, at least one control processor configured to cause data to be transmitted, at least one data transfer interface, a longitudinal axis, and at least three position determination sensors positioned along the longitudinal axis, wherein three of the at least three position determination sensors are three-dimensional acceleration sensors, and wherein said determination sensors are configured and positioned to provide measurement data for the determination of the position and movement of the electronic pen;
at least one data receiving interface for receiving the data transmitted by the data transfer interface-of the electronic pen;
a data processor for analyzing and processing the received data;
a memory; and
wherein the data processor can perform an integration and error correction processing of the received data, and can transmit the processed data for storing on the memory.

* * * * *